United States Patent Office 3,335,351
Patented Aug. 8, 1967

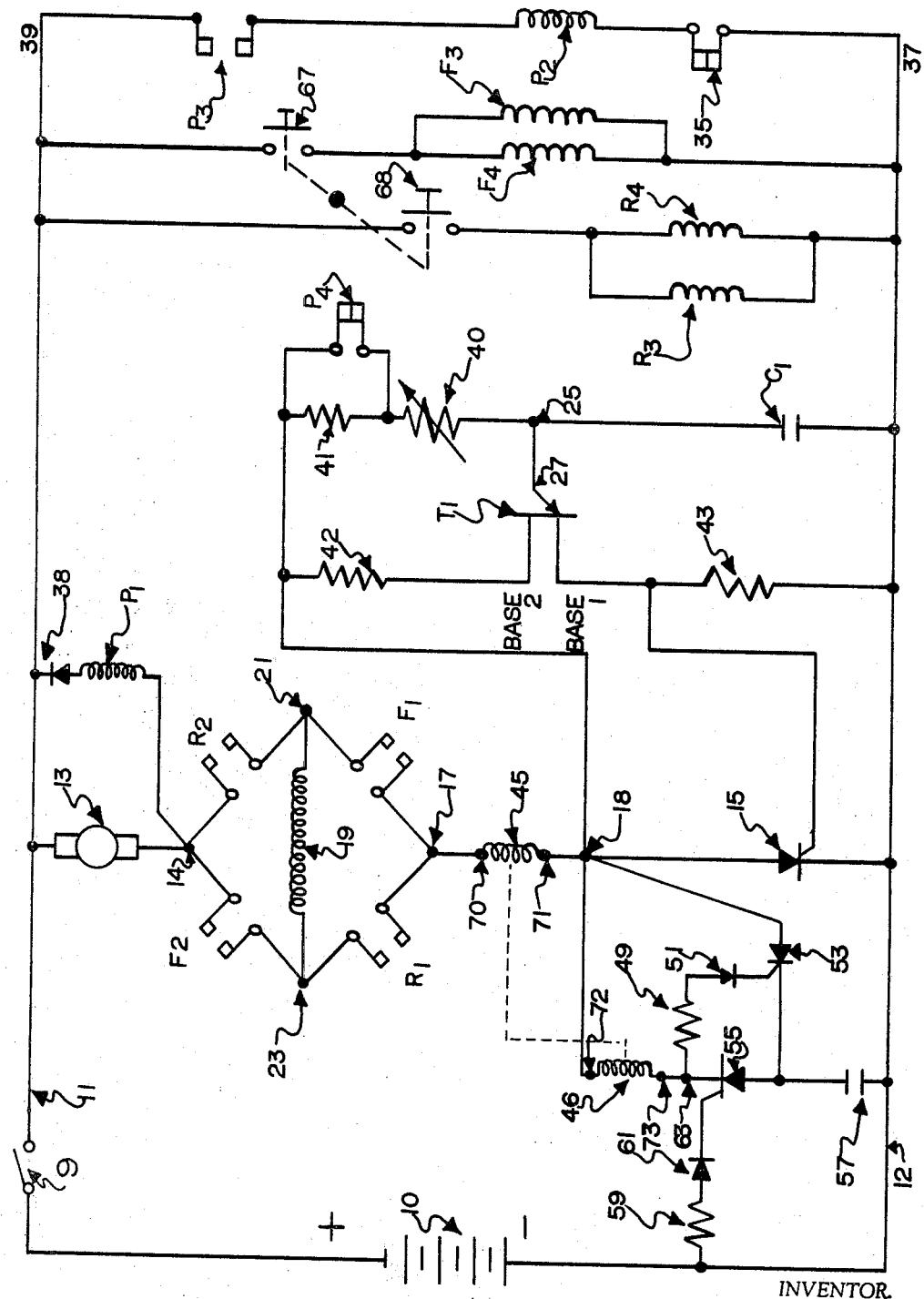

3,335,351
DC MOTOR CONTROL CIRCUIT
Herbert E. Morris, Roanoke, Va., assignor to General Electric Company, a corporation of New York
Filed Mar. 5, 1965, Ser. No. 437,532
5 Claims. (Cl. 318—341)

ABSTRACT OF THE DISCLOSURE

A control circuit for controlling the power to a motor from a direct current source has a first silicon controlled rectifier connected in series with the motor. A firing circuit is provided for firing the silicon controlled rectifier to energize the motor. A second controlled rectifier is provided in the control circuit with a commutating capacitor connected in series with the second silicon controlled rectifier across the first silicon controlled rectifier for stopping the conduction of the first silicon controlled rectifier when the first silicon controlled rectifier is conducting. A third silicon controlled rectifier is connected in series with the commutating capacitor. During the conduction of the first silicon controlled rectifier, the third silicon controlled rectifier is fired at a predetermined time to charge the commutating capacitor. After the third silicon controlled rectifier has been fired and the commutating capacitor charged, the commutating capacitor is discharged to stop the conduction of the first silicon controlled rectifier, and de-energize the load.

---

This invention is directed to a control circuit for controlling the average power to a load, and is particularly adapted to control direct current from a power source such as a battery to a direct current motor.

The direct current supplied to a load such as a direct current motor from a power source such as a battery or a filtered rectified alternating source may be selectively varied by controlling the average power supplied to the motor. This control circuit may use a solid state controlled rectifier as a power device which may be switched on at selected frequencies into a conducting state to supply power to the direct current motor.

The controlled rectifier normally used is the silicon controlled rectifier which is described in the Silicon Controlled Rectifier Manual, Third Edition, Copyright 1964 by the General Electric Company. A particular circuit which has found application in controlling the power to a direct current motor is described on pages 168–173 of the Silicon Controlled Rectifier Manual. The controlled rectifier is turned on or fired to supply power to the load. After the controlled rectifier has been turned on, it remains on until commutating energy is applied to turn the controlled rectifier off. The power applied to the load is determined by the ratio between the time that the controlled rectifier is turned on and the time that the controlled rectifier is turned off. It is important, of course, that the peak current does not approach the lock rotor current which could cause failure of the controlled rectifier and also damage to the motor. The control circuit using a controlled rectifier is often used for controlling a battery driven direct current motor and the control circuit used should be an efficient circuit.

It is often desirable in controlling direct current motors to engage in what may be termed dynamic braking or motor plugging. This means reversing the connections to the motor while the motor is coasting. In this manner the motor acts as a generator with the polarity reversed.

It is therefore an object of this invention to provide a new and improved control circuit using a controlled rectifier for controlling the power from a direct current source, such as a battery, to a load, such as a direct current motor.

Another object of this invention is to provide a new and improved control circuit using a controlled rectifier for controlling the power from a direct current source, such as a battery, to a load, such as a direct current motor which limits the peak current through the load and the controlled rectifier.

It is another object of this invention to provide a new and improved more efficient control circuit using a controlled rectifier for controlling the power from a direct current source, such as a battery, to a load such as a direct current motor.

An object of this invention is to provide a new and improved control circuit for a direct current motor using a controlled rectifier for controlling the power from a direct current source which includes a motor plugging circuit.

According to one form of this invention, therefore, a control circuit is provided for controlling the power to a load from a direct current source. A first controlled rectifier is connected in series with the load and a firing circuit is provided for firing the controlled rectifier to energize the load. A second controlled rectifier is provided in the control circuit with a commutating capacitor connected in series with the second controlled rectifier across the first controlled rectifier for stopping the conduction of the first controlled rectifier when the first controlled rectifier is conducting. A third controlled rectifier is connected in series with the commutating capacitor. During the conduction of the first controlled rectifier, the third controlled rectifier is fired at a predetermined time to charge the commutating capacitor. After the third controlled rectifier has been fired and the commutating capacitor charged, the commutating capacitor is discharged to stop the conduction of the first controlled rectifier, and de-energize the load.

The above described control circuit may be modified to provide for plugging. The first controlled rectifier is connected in series with the armature of the direct current motor. A firing circuit is provided for firing the first controlled rectifier and energizing the direct current motor at a predetermined frequency. The first controlled rectifier is commutated at a predetermined time after it conducts. The armature of the direct current motor may be driven as a generator; and when the armature is driven as a generator, the frequency of the firing of the first controlled rectifier is reduced accordingly. The direct motor thus slows down to a controlled stop.

The invention is set forth with particularity in the appended claims. The principles and characteristics of the invention, as well as other objects and advantages are revealed and discussed through the medium of the illustrative embodiments appearing in the specification and drawing which follow.

In the drawing:

The drawing shows a schematic of a preferred embodiment of this invention.

Referring to the drawing, the circuit therein is connected to a suitable direct current power supply 10, or a filtered, rectified AC supply by means of the main switch 9. Lines 11 and 12 are the positive and negative leads respectively.

One side of the motor armature 13 is connected to the positive line 11. The other side is connected to the normally open contacts of the forward contactor $F_2$ and the reverse contactor $R_2$ at point 14.

Point 23 is the junction point of the normally open contacts of the forward contactor $F_2$ and the reverse contactor $R_1$ and one side of the series field 19 of the motor. The other side of the series field 19 of the motor connects to the junction point 21 of the normally open contacts of reverse contactor $R_2$ and forward contactor $F_1$. Terminal point 70 of the primary 45 of the transformer connects to the junction 17 of the normally open contacts of the forward contactor $F_1$ and the reverse contactor $R_1$. Terminal 71 of transformer primary 45 connects to the anode of silicon controlled rectifier 15 of which the cathode is connected to the negative lead 12. One side of plugging relay coil $P_1$ is connected to point 14 while the other side is connected to the anode of diode 38. The cathode of diode 38 is connected to the positive line 11.

A point 18, which is a junction between one side of the transformer primary 45 and the anode of silicon controlled rectifier 15, is connected to the normally closed plugging relay contact $P_4$ and the junction between one side of the resistors 41 and 42.

The normally closed plugging relay contact $P_4$ and resistor 41 are connected in parallel and in series with adjustable resistor 40. The other side of resistor 40 is connected to the emitter of unijunction transistor $T_1$ and one side of capacitor $C_1$. The other side of capacitor $C_1$ connects to the negative line 12. Base 2 of unijunction transistor $T_1$ is connected to resistor 42. Base 1 of unijunction transistor $T_1$ connects to resistor 43 and to the gate of silicon controlled rectifier 15. The other side of resistor 43 is connected to negative line 12.

Point 37 is a junction between the negative line 12 and the normally closed contact 35 of the start switch. The other side of this normally closed contact 35 is connected to plugging relay coil $P_2$, which is in series with the normally open plugging relay contact $P_3$. Point 39 connects the other side of normally open plugging relay contact $P_3$ to the positive line 11.

Through point 18 terminal point 72 of the transformer secondary 46 is connected to terminal point 71 of the transformer primary 45 and to the anode of silicon controlled rectifier 53.

The gate of the silicon controlled rectifier 53 is connected to the cathode of diode 51 and the anode of diode 51 is connected to one side of resistor 49. The other side of resistor 49 connects to the junction of the cathode of silicon controlled rectifier 55 and terminal point 73 of the transformer secondary 46. The anode of silicon controlled rectifier 55 connects to the cathode of silicon controlled rectifier 53 and through capacitor 57 to the negative line 12.

The gate of silicon controlled rectifier 55 connects to cathode of diode 61 and the anode of diode 61 connects to one side of resistor 59. The other side of resistor 59 connects to the negative line 12.

Forward contactor coils $F_3$ and $F_4$ are connected in parallel. One side of each of the forward contactor coils $F_3$ and $F_4$ is connected to the negative line 12 and the other side connected to the forward pushbutton 67. The forward pushbutton 67 connects to the positive line 11. Reverse pushbutton 68 is connected to the junction of the reverse contactor coils $R_3$ and $R_4$ which are connected in parallel and to the positive line 11.

The forward pushbutton 67 and the reverse pushbutton are mechanically interlocked so that when one is depressed to close the contacts the other automatically opens.

To start main switch 9 must be closed. Depending on the selection of direction either the forward pushbutton 67 or the reverse pushbutton 68 is depressed.

Assuming forward direction, pushbutton 67 is depressed and forward contactor coils $F_3$ and $F_4$ are energized. This causes forward contacts $F_1$ and $F_2$ to close and through the operation of the relaxation oscillator and the chopper circuit, described later, silicon rectifier 15 is turned on. Current now flows from the power source 10 through main switch 9, positive line 11, motor armature 13, forward contactor $F_2$, motor field 19, forward contactor $F_1$, transformer primary 45 and silicon rectifier 15 into negative line 12.

The direction in which the armature 13 turns depends on the direction of the flow of current in the motor field 19. To accomplish bi-directional motion, it becomes necessary to provide some form of directional switching of the motor field. In the drawing this switching is provided for by two forward contactors $F_1$ and $F_2$ and two reverse contacts $R_1$ and $R_2$, all of which are actuated by their respective coils $F_3$ and $F_4$ for the forward contactors and $R_3$ and $R_4$ for the reverse contactors.

By depressing forward button 67 the forward contactor coils $F_3$ and $F_4$ are energized which causes the forward contactor normally open contacts $F_1$ and $F_2$ to close.

The current from the power source 10 now flows through positive lead 11, the motor armature 13, forward contact $F_2$, connection point 23, motor field 19, connection point 21, forward contact $F_1$, transformer primary 45, connection point 18 and silicon controlled rectifier 15 to the negative line 12. Assuming now that with this scheme the motor is running in the forward direction, then to reverse the motor the reverse button 68 is depressed. The reverse button 68 and the forward button 67 are mechanically interlocked so that when one is depressed the other is released. Button 67 is therefore released, the forward contactor coils $F_3$ and $F_4$ are de-energized, and the forward contactor contacts $F_1$ and $F_2$ open. With the reverse button 68 closed, the reverse contactor coils $R_3$ and $R_4$ are energized. The reverse contactor normally open contacts $R_1$ and $R_2$ are now closed. The current flow is now from the positive line 11, through the motor armature 13, connection point 14, reverse contactor contacts $R_2$, connection point 21, motor field 19, connection point 23, reverse contactor contacts $R_1$, connection point 17, transformer primary 45, connection point 18 and silicon controlled rectifier 15 into the negative line 12. The main interest here is that the current in the forward mode flowed from point 23 through the field 19 to point 21 and in the reverse mode from point 21 through the field to point 23. This reverse action causes the motor to run in the reverse direction.

The speed adjustment consists primarily of a unijunction transistor $T_1$ and an adjustable resistor 40 through which a capacitor $C_1$ is charged.

With no emitter current flowing through the unijunction transistor $T_1$, the unijunction transistor $T_1$ in combination with resistors 42 and 43 acts as a simple voltage divider. Only a small fraction of the voltage between base 1 and 2 of the unijunction transistor $T_1$ will appear at the emitter 27. The unijunction transistor is said to be reverse biased.

As capacitor $C_1$ is charged, through adjustable resistor 40, the voltage at point 25 will rise. This voltage will appear at the emitter 27 of the unijunction transistor $T_1$; and when it is greater than the reverse bias, the unijunction transistor $T_1$ turns on. The base 1 of the unijunction $T_1$ now becomes more positive with respect to the negative line 12. This additional voltage appears at the gate of the silicon controlled rectifier 15 and turns it on.

With the silicon controlled rectifier 15 turned on, the current can pass through the armature 13 and the field 19, causing the motor to run.

When the unijunction transistor $T_1$ turned on, the capacitor $C_1$ immediately discharged through the emitter. This discharge causes the voltage of point 25 to drop to a point which is below the bias voltage at emitter 27 of the unijunction transistor $T_1$. This turns the unijunction transistor $T_1$ off and readies the oscillator for the next cycle.

The rate at which the capacitor $C_1$ charges and consequently the frequency of pulses at the gate of the silicon controlled rectifier 15 is dependent on the value of resistance selected for resistor 40, and determines the speed of the motor. The capacitor $C_1$ can however not recharge as long as the silicon controlled rectifier is turned on, since the voltage differential between point 18 and the negative line 12 is very small during the "on" period.

The silicon controlled rectifier 15 stays on until it is turned off by the chopper circuit.

When the silicon controlled rectifier 15 first turns on, the motor current also flows through the transformer primary 45. This current flow induces a voltage in the transformer secondary 46 such that point 63 becomes negative with respect to the negative line 12. Current now flows through resistor 59 and diode 61 into the gate of silicon controlled rectifier 55, turning it on.

When the motor is operating in the forward direction, dynamic braking is accomplished by depressing reverse button 68. Because of mechanical interlocking the forward button 67 is released and the forward contactor coils $F_3$ and $F_4$ are de-energized which causes the forward contacts $F_1$ and $F_2$ to open. With reverse button 68 closed, reverse contactor coils $R_3$ and $R_4$ are energized and reverse contacts $R_1$ and $R_2$ are closed.

The current flow through the motor field 19 has now reversed its direction and the motor armature 13 now tries to reverse its direction. The inertia of motor armature 13 and its load (not shown) causes the motor to act as a generator. The counter electromotive force is now reversed and a current flows from connection point 14, through coil $P_1$ of the plugging relay and diode 38 into positive line 11, causing current coil $P_1$ to be energized. The plugging relay contact $P_3$ now closes, which causes current to flow through the voltage coil $P_2$ of the plugging relay. Since voltage coil $P_2$ and the contact $P_3$ are both on the same plugging relay, the coil $P_2$ will be energized as long as contact $P_3$ is closed and vice versa, as long as the start contacts 35 remain closed.

As contact $P_3$ of the plugging relay closes, contact $P_4$ of the plugging relay opens and connects resistor 41 in series with resistor 40. The new resistor value of the combination of resistors 40 and 41 slows down the charge-discharge frequency of capacitor $C_1$ and the motor slows down to a controlled stop. As the motor stops, counter electromotive force through coil $P_1$ of the plugging relay will go to zero. The calibration of resistor 41 is such that the motor stalls in the reverse direction as long as plugging relay contact $P_4$ remains open.

By opening the start contact 35 the current flow through the voltage coil $P_2$ of the plugging relay is broken and the coil is de-energized; since no current is flowing through the current coil $P_1$ of the plugging relay, the relay drops out and contact $P_4$ closes. This removes resistor 41 from the circuit and applies full voltage to capacitor $C_1$. This starts the charging cycle and because the reverse contacts $R_1$ and $R_2$ are still closed, the motor starts in the reverse direction at a speed proportional to the preselected value of resistor 40.

The terms forward and reverse are only relative and reverse is used to indicate the opposite of forward. Forward is therefore the opposite of reverse and therefore by depressing the forward button 67, the events described above will repeat themselves, except in the opposite direction.

With silicon controlled rectifier 55 now conducting, the transformer secondary 46 draws current away from the capacitor 57, charging it negatively.

Transformer secondary 46 saturates and its magnetic field collapses, causing point 63 to become positive with respect to capacitor 57. This switches the silicon controlled rectifier 55 off and furnishes current through resistor 49 and diode 51 to the gate of silicon controlled rectifier 53, which then turns on.

With the silicon controlled rectifier 53 on, capacitor 57 is placed across silicon controlled rectifier 15 in such a manner as to reverse the voltage across this silicon controlled rectifier 15, thereby turning it off. The capacitor 57 completely discharges and the current through silicon controlled rectifier 53 goes to zero. This turns silicon controlled rectifier 53 off.

With silicon controlled rectifier 15 off, full voltage will exist across capacitor $C_1$ which will start the charging cycle.

The starting time of transformer secondary 46 controls the commutating of the load through controlled rectifier 15. This prevents the peak current from reaching a value that cannot be commutated by the limited amount of energy stored in capacitor 57. The transformer secondary 46 is saturated at a predetermined value of ampere-milliseconds. At running speeds and light loads, the amperes are lowest, therefore, the time is longest causing a longer conduction time of load current through controlled rectifier 15, resulting in high motor speeds. As the load increases, the peak current increases and the saturating time of the transformer becomes shorter preventing the current from rising to as high a value as it would if the time had not changed. This provides ample torque at heavy loads but prevents the peak current from approaching lock rotor current which would cause failure of controlled rectifier 15 and damage to the motor.

An alternate circuit may be identical to the drawing except that portion of the circuit containing components 35, $P_2$ and $P_3$ between connection points 37 and 39 is removed.

At the time of dynamic braking, the plugging relay contact $P_4$ is held open only through the action of the plugging relay coil $P_1$. This coil is energized only so long as there is a counter electromotive force produced by the motor. As the motor slows down and finally stops, the electromotive force goes to zero. The plugging relay coil $P_1$ is de-energized and the contact $P_4$ closes.

Resistor 41 is now removed from the circuit and the motor reverses at a predetermined speed, depending on the preselected setting of resistor 40.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. A control circuit for selectively varying the power supplied to a load from a direct current source comprising, a first controlled rectifier connected in series with said load, a firing circuit for firing said first controlled rectifier and energizing said load, a second controlled rectifier, a commutating capacitor connected in series with said second controlled rectifier across said first controlled rectifier for stopping conduction of said first controlled rectifier when said second controlled rectifier is fired, a third controlled rectifier connected in series with said commutating capacitor, means energized during the conduction of said first controlled rectifier for firing said third controlled rectifier at a predetermined time to charge said commutating capacitor, and means responsive to the firing of said third controlled rectifier for firing said second controlled rectifier to discharge said commutating capacitor and stop the conduction of said first controlled rectifier.

2. A control circuit for selectively varying the power supplied to a load from a direct current source comprising, a first controlled rectifier connected in series with said load, a relaxation oscillator for firing said first controlled rectifier into conduction at a selected frequency, said relaxation oscillator including means for selectively adjusting said frequency, a second controlled rectifier, a commutating capacitor connected in series with said second controlled rectifier across said first controlled rectifier for stopping conduction of said first controlled rectifier when said second controlled rectifier is fired, a third controlled rectifier connected in series with said commutating capacitor, means energized during the conduction of said first controlled rectifier for firing said third controlled rectifier at a predetermined time to charge said commutating capacitor, and means responsive to the firing of said third controlled rectifier for firing said second controlled rectifier to discharge said commutating capacitor and stop the conduction of said first controlled rectifier 3. A control circuit for selectively varying the power supplied to the armature of a direct current motor comprising, a first controlled rectifier; a transformer having a primary and a secondary winding; means for connecting said first controlled rectifier, the armature of said direct current motor, and the primary winding of said transformer in series; a firing circuit for firing said first controlled rectifier and energizing the armature of said direct current motor; a second controlled rectifier; a commutating capacitor connected in series with said second controlled rectifier across said first controlled rectifier for stopping conduction of said first controlled rectifier when said second controlled rectifier is fired; a third controlled rectifier; means for connecting said third controlled rectifier and the secondary winding of said transformer in series with said commutating capacitor, so that the primary winding of said transformer induces a voltage in the secondary of transformer to fire said third controlled rectifier after a predetermined time, and charge said commutating capacitor; and means responsive to the firing of said third controlled rectifier for firing said second controlled rectifier to discharge said commutating capacitor and stop the conduction of said first controlled rectifier.

4. A control circuit for selectively varying the power supplied to the armature of a direct current motor from a direct current source comprising, a controlled rectifier connected in series with the armature of said direct current motor, a relaxation oscillator for firing said controlled rectifier into conduction at a selected frequency to energize said motor, said relaxation oscillator including means for selectively adjusting said frequency, means responsive to the firing of said controlled rectifier for commutating said first controlled rectifier a predetermined time after it conducts, means for driving said direct current motor as a generator, and means responsive to the driving of said motor as a generator for reducing the frequency of said relaxation oscillator to reduce the frequency of firing of said controlled rectifier.

5. A control circuit for selectively varying the power supplied to the armature and field of a direct current motor from a direct current source comprising, a controlled rectifier connected in series with the armature and field of said direct current motor, means for reversing the direction of current flow in the field of said direct current motor, a relaxation oscillator for firing said controlled rectifier into conduction at a selected frequency to energize said motor, said relaxation oscillator having an adjustable resistor to selectively adjust said frequency, means responsive to the firing of said controlled rectifier for commutating said controlled rectifier a predetermined time after it conducts, a relay coil and a diode connected across the armature of said direct current motor so that said relay coil is energized by the counter electromotive force generated by said motor when the direction of current flow in the field of said direct current motor is reversed during operation, and means operated by said relay coil when energized to reduce the frequency of said relaxation oscillator so that said motor is slowed down to a stop.

References Cited
UNITED STATES PATENTS

| | | | |
|---|---|---|---|
| 2,911,579 | 11/1959 | Mueller | 318—381 X |
| 3,222,582 | 12/1965 | Heyman et al. | 318—341 X |
| 3,281,635 | 10/1966 | Hohne | 318—341 X |
| 3,297,930 | 1/1967 | Payne | 318—341 X |

BENJAMIN DOBECK, *Primary Examiner.*

ORIS L. RADER, *Examiner.*

J. J. BAKER, *Assistant Examiner.*